July 9, 1963
A. A. MONSON
3,097,166
SEWAGE DISPOSAL STRUCTURE
Filed Feb. 1. 1960
2 Sheets-Sheet 1
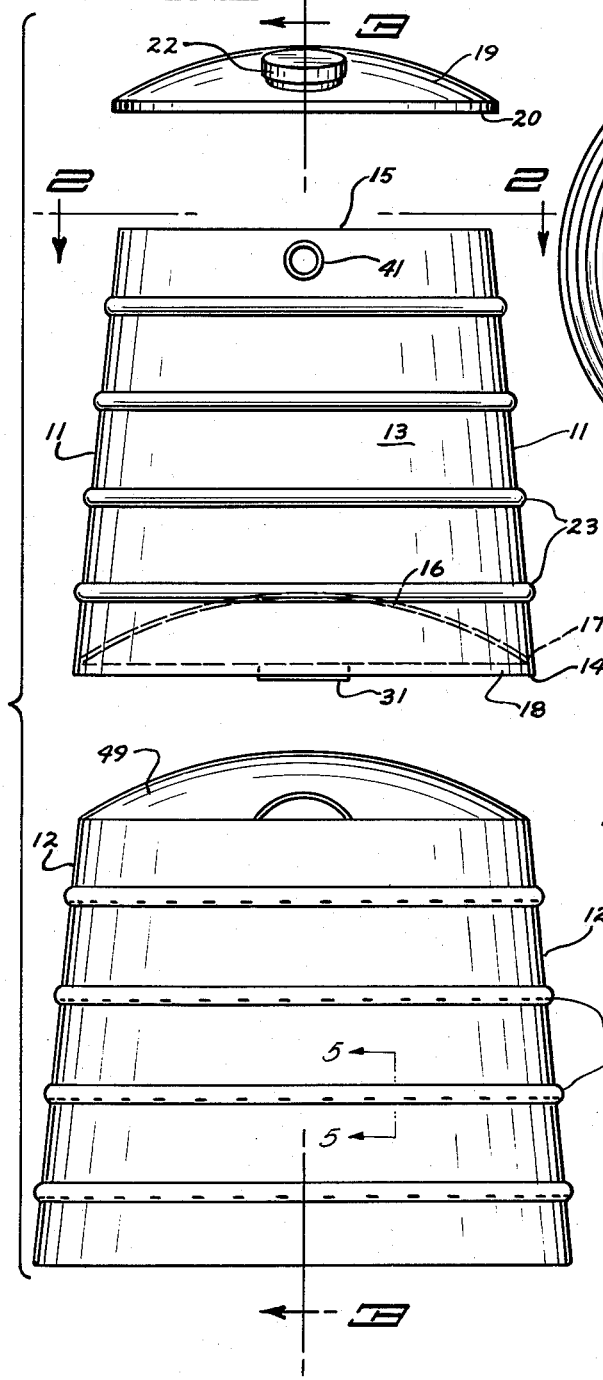
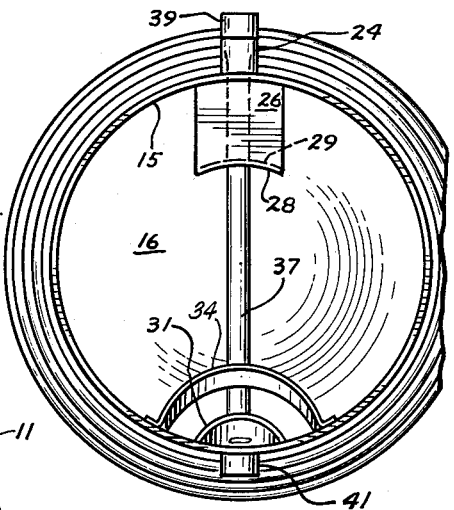
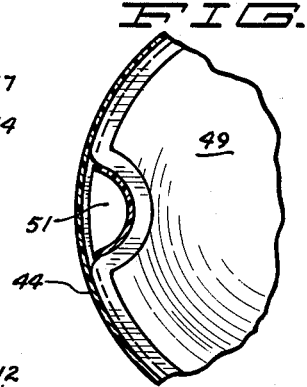
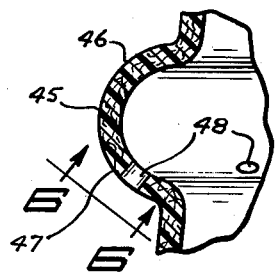
INVENTOR.
ARNOLD A. MONSON
BY
*Frederick C. Meyers*
ATTORNEY

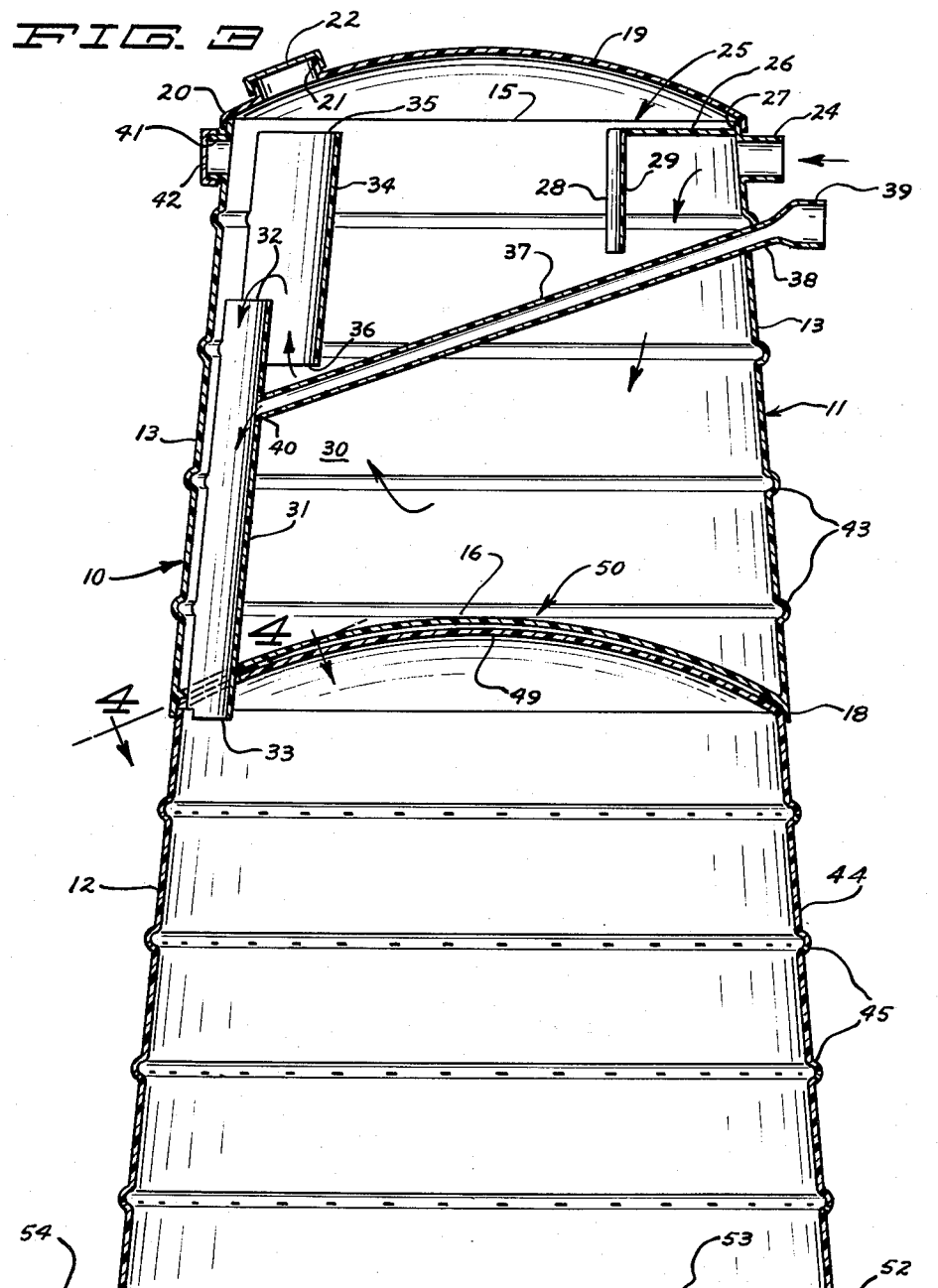
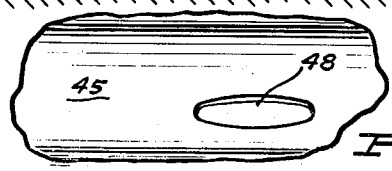

United States Patent Office 3,097,166
Patented July 9, 1963

3,097,166
SEWAGE DISPOSAL STRUCTURE
Arnold A. Monson, New Brighton, Minn.
(4538 NE. 7th St., Minneapolis, Minn.)
Filed Feb. 1, 1960, Ser. No. 5,970
5 Claims. (Cl. 210—170)

This invention relates to the disposal of sewage and more particularly to a lightweight sewage disposal structure.

In my U.S. Patent No. 2,796,176, issued June 18, 1957, I disclose apparatus which combines a septic tank with a cesspool structure, the entire apparatus being adapted for installation in a single excavation. The combined unit of the patented structure calls for a cesspool unit installed at the bottom of the excavation, the cesspool unit being provided with leaching apertures through which liquid can permeate into the soil. A closure is provided for the cesspool unit which also divides the upper end of the cesspool from a septic tank unit disposed directly above. The septic tank receives raw sewage and maintains the sewage at a constant height to permit bacterial action to destroy and liquify most of the solid material present. A baffled passageway is shown which holds back floating sludge material to prevent it from clogging the passageway and to minimize the transfer of solids to the cesspool portion.

The present invention constitutes a combined septic and cesspool structure of the same general nature as disclosed in the above numbered patent but has certain novel improved features which are set forth below.

It is a general object of the present invention to provide a combined septic tank and cesspool structure which is highly efficient in operation and is inexpensive to manufacture, transport and install.

More specifically, it is an object of the invention to provide a sewage disposal structure which will prevent excessive dilution of septic tank contents and consequent slowing of bacterial action upon the solids therein.

Another object of the invention is to provide a lightweight structure which can be manufactured from reinforced plastic material wherein functional portions serve to brace and give strength thereto.

Further it is an object to provide a sewage disposal structure which will minimize clogging and plugging of the passageway and apertures and will lend itself to easy and efficient cleaning.

Still further it is an object of the invention to provide a dual sewage disposal structure in which the parts are generally frusto-conical and hollow in character so that the two major portions thereof may be internested to reduce the over-all all volume during storing and transportation, the individual parts being light in weight and capable of being lifted by hand for installation in a single excavation prior to connecting plumbing fixtures therewith.

These and other objects and advantages of my invention will more fully appear from the following description, made in connection with the accompanying drawings, wherein like reference characters refer to the same or similar parts throughout the several views and in which:

FIGURE 1 is an exploded view of the components of my sewage disposal structure, the parts being shown in general alignment prior to assemblage;

FIGURE 2 is a top plan view of the upper septic tank unit taken on the line 2—2 of FIG. 1;

FIGURE 3 is a vertical section of the entire structure 15 taken on line 3—3 of FIG. 1;

FIGURE 4 is an enlarged section of a fragment of the structure taken on the line 4—4 of FIG. 3;

FIGURE 5 is an enlarged fragment in section taken on the line 5—5 of FIG. 1; and FIGURE 6 is an enlarged detail of a fragment of the rib structure showing the appearance of an aperture formed therein.

With continued reference to the drawings, my sewage disposal structure is shown in composite form in FIGS. 1 and 3. Generally the structure comprises an elongated holder construction shown generally at 10 in FIG. 3 wherein a septic tank unit 11 is placed directly over the cesspool unit 12 in the relation shown. The upper or septic unit 11 has an enclosing side wall 13 with a sloping form extending convergently from the bottom edge 14 to the top edge 15 as shown in FIG. 1. The sloping side wall construction creates a frusto-conical configuration which has additional functions as will be subsequently pointed out. The upper unit has a bottom wall 16 as shown in FIGS. 1, 2 and 3 which is upwardly curved and joined to the enclosing side wall 13 in a water tight connection at 17 a short distance above the lower edge of 14. The lower edge 14 constitutes a flange 18 below the bottom 16 which extends circumferentially about the entire bottom as shown. The top edge 15 of the upper septic unit 11 surrounds the open top of the unit and is adapted to interfit with cover 19. The cover 19 has a depending lip 20 which lies outwardly of the upper edge 15 as shown in FIG. 3. A flanged opening 21 is formed adjacent the lip 20 and is provided with a cap 22 which may be removed when it is desired to gain access to the interior of the septic tank 11 or other portions thereof as will be subquently described. The septic tank 11 has rib members 23 which extend circumferentially about the tank and may be formed convexly outward from the wall structure 13 as shown. Ribs 23 function to strengthen the wall 13 against outward pressure of sewage within the septic unit 11 as well as from pressure against the outer surface of wall 13 when the structure is positioned within a filled excavation.

Adjacent the top edge 15 of the upper septic unit 11 is a raw sewage inlet 24 which is adapted to receive standard plumbing fixtures or pipes (not shown). As raw sewage enters from the inlet 24, it impinges against a shield member shown generally at 25. The shield member, in turn, consists of a top horizontal plate 26 which is secured along its inner edge 27 to the inside of wall 13 adjacent top edge 15. Secured in depending relation to the top horizontal plate 26 is a vertical plate 28 having a convex face 29 in spaced confronting relation with raw sewage inlet 24 as shown in FIGS. 2 and 3. The rate of curvature of face 29 may be such as to render it concentric with the wall 13. It will be noticed that laterally and downwardly between the depending portion 28 and the raw sewage inlet 24, a clear and unobstructed space exists so that raw sewage forcibly entering the inlet 24 will not unduly agitate the contents of the septic tank nor will it impinge or splatter within the upper septic unit. At the same time, objects which would tend to plug the interior portions of the septic tank are permitted to drop away from or escape from the sides of the shield member 25. Where a cleaning instrument such as rotary flexible cutters or a plumber's snake is inserted through the sewer pipe the working end thereof will enter the interior of upper unit 11 and be deflected to the right or left of the curved surface 29. Thus the cleaning instrument (not shown) will be less apt to buckle upon itself and become tangled and knotted.

At the opposite side of the septic unit 11 from the raw sewage inlet 24, and secured to the inner surface 30 of wall 13, is an effluent passageway 31 as shown in FIGS. 2 and 3. The effluent passageway 31 has an upper open end 32 which lies somewhat above the middle of the septic unit 11 and a lower terminus 33 which extends through the curved bottom 16 as shown in FIG. 3. A baffle 34 for holding back floating sludge from entering the upper open end of effluent passageway 31 is secured to the inner surface 30 of side wall 13 so as to surround the upper portion of effluent passageway 31 in spaced clearance therewith. The baffle 34 extends both upwardly and downwardly from a plane defining the upper open end 32 of effluent passageway 31. Thus the upper edge 35 of baffle 34 prevents material from flowing over the baffle until its height reaches that of the cover 19. The bottom edge 36 of baffle 34 is spaced below the upper open end 32 of effluent passageway 31 so as to hold back floating sludge and to permit only the clear liquid effluent to enter past the lower edge 36 then up and over into the upper open end 32 of effluent passageway 31.

A by-pass pipe 37 traverses the interior of the upper or septic unit 11 and is secured at 38 below the raw sewage inlet 24 as shown. By-pass pipe 37 may be provided with a flange connector 39 to which a direct pipe may be fitted to connect with floor drains, laundry tubs and the like, from which the waste water will pass directly to the by-pass pipe without being subjected to bacterial action. The character and quantity of solids present in such water does not require treatment in the septic tanks and by by-passing the same will not dilute and flush out sewage which is undergoing decomposition. By-pass pipe 37 communicates with the effluent passageway 31 and is secured thereto at 40 as shown in FIG. 3. The position of securement is such that the by-pass pipe 37 slopes downwardly toward the effluent passageway 31 and admits waste water to the passageway 31 below the upper edge 32 as shown in FIG. 3. Since the by-pass pipe 37 is secured at each end and traverses the upper or septic unit 11, a strengthening or supporting effect is thereby gained which tends to rigidify the wall structure.

A drain outlet 41 may be supplied at the upper end of the septic unit 11 in a position such as to be shielded by the baffle 34 to permit clear liquid to pass to the drain field as desired. When the sewage disposal structure is employed in its entirety the drain outlet 41 will normally be capped by the screw threaded cover 42. The wall structure 13 as well as the other parts of the septic unit 11 may be constructed of plastic material reinforced with fiber glass to create a strong and light structure which is highly resistant to chemical action. Molding techniques which are known to the art lend themselves readily to manufacture of the unit and permit rib members 43 to be formed in the wall structure 13 when the unit is molded.

The lower or cesspool unit 12 may be similarly constructed of reinforced plastic material and the side structure 44 thereof may be sloped forwardly and inwardly to provide a generally frusto-conical configuration which aligns said wall structure 44 with the side wall structure 13 when the upper and lower units 11 and 12 are interfitted as shown in FIG. 3. The side wall 44 is provided with a plurality of raised molded ribs 45 which extend circumferentially of the unit and may be of the same character as ribs 43 in the upper unit 11.

Each of the ribs 45 presents an upper outwardly sloping surface 46 and an inwardly and downwardly sloping surface 47 as shown in FIG. 5. A plurality of spaced apertures 48 are formed through the inwardly and downwardly sloping surface 47 of each of the ribs 45 as shown in FIGS. 5 and 6. The position of each of the apertures 48 is such as to form an orifice directed downwardly and outwardly from the interior of the lower or cesspool unit 12. The arrangement of the ribs 45 and the apertures 48 formed therein is such as to provide an even distribution of leaching points for the fluid transferred to the cesspool structure from the upper unit 11.

The fluid then leaches into porous earth to complete the sewage cycle.

The cesspool or lower unit 12 may be provided with a top closure 49 having a raised or dome-like configuration mating with the bottom 16 of the upper unit 11. The combined curved closures provide a divider structure indicated generally at 50 which separates the upper space of unit 11 from the lower space of unit 12. The top closure 49 of the lower unit 12 is provided with an opening 51 adjacent the wall 44 and the opening is of such shape as to closely receive the lower end 33 or effluent passageway 31 as shown in FIGS. 3 and 4. The lower margin 18 of upper unit 11 interfits about the upper edge of wall structure 44 to position the upper unit 11 and lower unit 12 in axial relation. The lower end 33 of effluent passageway 31 provides a key with opening 51 which additionally secures the upper and lower units together to assure against the relative movement prior to the back filling of the excavation (not shown) when installation of the sewage disposal structure is completed.

In the form shown the lower unit 12 has an inwardly extending flange portion 52 which is angular at the lower end of wall structure 12 and defines a large opening 53 at the bottom of the lower unit 12. Thus fluid in the lower or cesspool structure 12 can pass directly through the bottom opening 53 or if surface water levels do not permit or the bottom excavation 54 upon which the sewage disposal structure stands becomes sealed, then, of course, all of the fluid must leach outwardly through the apertures 48 as previously described.

In the installation of my sewage disposal apparatus a single excavation is dug down and provided with a bottom 54. The lower unit 12 is positioned thereon as shown in FIG. 3. The total weight of the lower unit is such that one or two men can easily handle the same without the use of equipment. The upper unit 11 is then brought into alignment with the lower unit 12 as shown in FIG. 1, the lower flanged margin 18 and the lower end of the passageway 31 being interfitted as previously described. Cover 19 may then be secured in place, the opening 21 and its cap 22 being so positioned as to overlie the baffle 34 and effluent passageway 31.

Conventional sewer pipes or conduits are then connected with the inlet 24 and separate waste water pipes are connected to the fitting 39, following which the excavation is back-filled with porous material such as sand or gravel, and the top 19 is covered.

Raw sewage entering the inlet 24 impinges upon the curved surface 29 of depending plate 28 and is prevented from forcibly agitating the sludge or splashing into the effluent passageway 31. Since the space to the sides and bottom of the shield members 25 offers no obstruction, solids will pass freely to the interior chamber of the septic unit 11. When the level of the fluid is such that it reaches the height of the upper end 32 of the effluent passageway 31 then it will pass under baffle 34 and over the upper edge 32 as previously described. Sludge floating upon the liquid will be maintained away from the effluent passageway and only the clear liquid will pass therein. Bacterial action will proceed with respect to raw sewage material but waste water entering by-pass pipe 37 will go directly to the effluent passageway 31 and thence to the septic unit 12. The combined clear liquid and waste water is then retained in the cesspool unit 12 only for such period of time as will permit it to leach outwardly through the apertures 48.

When it is desired to remove the contents of either the upper or lower units, or to flush out the interior thereof, flexible conduit may be introduced through opening 21 in top cover 19 and directed either through the bottom of baffle 34 to clear the upper unit 11 or into the effluent passageway 31 and then downwardly into the cesspool unit 12 to clean or flush the latter.

It will, of course, be understood that various changes may be made in the form, details, arrangements and proportions of the parts without departing from the scope of my invention as set forth in the appended claims.

What is claimed is:

1. In a sewage disposal structure, a septic unit having an enclosing side wall, a bottom wall and top closure defining a sewage chamber, a raw sewage inlet communicating with said chamber adjacent the top of said side wall, an effluent passageway having its upper end within the chamber and adjacent the top thereof and extending downwardly to terminate exteriorly of the chamber adjacent the bottom thereof, and a waste water by-pass pipe extending exteriorly of said sewage chamber and passing therethrough for communicating with said effluent passageway intermediate its upper end and downward terminus, whereby waste water of low solid content may be by-passed directly to the effluent passageway without diluting the contents of the sewage chamber while bacterial action in the septic unit progresses.

2. In a sewage disposal structure, a septic unit having an enclosing side wall, a bottom wall and top closure defining a sewage chamber, a raw sewage inlet communicating with said chamber adjacent the top of said side wall, an effluent passageway in spaced relation with said raw sewage inlet having its upper end within the chamber and adjacent the top thereof and extending downwardly to terminate exteriorly of the chamber adjacent the bottom thereof, and a waste water by-pass pipe secured to said enclosing side wall adjacent said raw sewage inlet and traversing said sewage chamber, said by-pass pipe being rigidly secured to said effluent pasageway intermediate the top and bottom thereof and having communication with the interior thereof whereby waste water of low solid content may by-pass directly through said by-pass pipe to the effluent passageway without diluting the contents of the sewage chamber while bacterial action in the septic unit progresses.

3. A sewage disposal structure adapted to be installed in a single excavation, said structure comprising, a generally elongated hollow construction having substantially circular cross-section defined by a a peripheral upstanding side wall extending from the bottom to the top thereof, said wall being provided with a plurality of horizontal ribs running circumferentially thereof, a water tight divider traversing the hollow structure substantially medially of its upper and lower ends, a removable closure over the top of said hollow structure, a raw sewage inlet communicating with the hollow structure adjacent the top thereof, an effluent passageway having its upper end within the hollow structure adjacent the closure and extending downwardly to terminate within said hollow structure below the divider, said ribs formed below the divider having apertures in spaced relation therealong whereby effluent liquid in the hollow structure discharged from above the divider to the hollow structure below the divider will leach outwardly through said apertures.

4. The subject matter set forth in claim 3 wherein the ribs are formed in outwardly convex relation circumferentially of the hollow structure and the apertures are located in spaced relation along the lower curved face of said ribs so as to direct the leached effluent fluid outwardly and downwardly from the hollow structure.

5. In a sewage disposal structure, a septic unit having an enclosing side wall, a bottom wall and top closure defining a sewage chamber, a raw sewage inlet communicating with said chamber adjacent the top of said side wall, a shield member having a horizontal top plate secured to the inner surface of said side wall only at a position above said raw sewage inlet and extending inwardly therefrom and further having a vertical plate depending from said horizontal top plate and lying in spaced aligned relation with said raw sewage inlet and providing free clearance with said side wall and open communication with said sewage chamber laterally and downwardly from around said inlet, said vertical depending plate being convexly curved toward said raw sewage inlet, an effluent passageway having its upper end within the chamber and adjacent the top thereof and extending downwardly to terminate exteriorly of the sewage chamber adjacent the bottom thereof, and baffle means surrounding the upper end of said fluid passageway and extending upwardly and downwardly therefrom whereby raw sewage will be deflected without impinging on said effluent passageway and floating sludge material will be retained within the chamber for subsequent bacterial action.

References Cited in the file of this patent
UNITED STATES PATENTS

| | | |
|---|---|---|
| 1,331,735 | Wilson | Feb. 24, 1920 |
| 2,796,176 | Monson | June 18, 1957 |

FOREIGN PATENTS

| | | |
|---|---|---|
| 484,635 | Great Britain | May 9, 1938 |
| 564,264 | Italy | June 13, 1957 |